(12) United States Patent
Luong et al.

(10) Patent No.: US 10,853,085 B2
(45) Date of Patent: Dec. 1, 2020

(54) ADJUSTABLE PERFORMANCE BOOT SYSTEM

(71) Applicant: Dell Products L.P., Round Rock, TX (US)

(72) Inventors: Anh Dinh Luong, Austin, TX (US); Po-Yu Cheng, Tainan (TW); Juan Francisco Diaz, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 88 days.

(21) Appl. No.: 16/362,324

(22) Filed: Mar. 22, 2019

(65) Prior Publication Data
US 2020/0301715 A1  Sep. 24, 2020

(51) Int. Cl.
*G06F 9/44* (2018.01)
*H04L 9/06* (2006.01)
*G06F 9/4401* (2018.01)

(52) U.S. Cl.
CPC .......... *G06F 9/4401* (2013.01); *H04L 9/0643* (2013.01)

(58) Field of Classification Search
CPC ..... G06F 9/4401; G06F 21/575; H04L 9/0643
See application file for complete search history.

(56) References Cited

U.S. PATENT DOCUMENTS

| 4,153,916 | A | 5/1979 | Miwa et al. |
| 7,675,867 | B1 | 3/2010 | Mraz et al. |
| 9,098,302 | B2 * | 8/2015 | Swanson ............... G06F 9/4406 |
| 9,207,948 | B2 * | 12/2015 | Jiang ................... G06F 11/1417 |
| 2014/0250291 | A1 | 9/2014 | Adams et al. |
| 2018/0004591 | A1 * | 1/2018 | Volentine ............ G06F 11/0793 |
| 2018/0330093 | A1 * | 11/2018 | Shivanna .............. G06F 21/575 |

* cited by examiner

*Primary Examiner* — Stefan Stoynov
(74) *Attorney, Agent, or Firm* — Haynes and Boone, LLP (57) ABSTRACT

An adjustable performance boot system includes a processing system and an SPI memory storing firmware volumes. The processing system retrieves, via an SPI interface at a first SPI interface performance level, a first firmware volume including a first hash value generated using a second firmware volume. The processing system then increases the SPI interface performance level, retrieves the second firmware volume via the SPI interface at the increased SPI interface performance level, generates a second hash value using that second firmware volume and, in response to it not matching the first hash value, lowers the SPI interface performance level. The processing system then retrieves the second firmware volume via the SPI interface at the decreased SPI interface performance level, generates a third hash value using that second firmware volume and, in response to it matching the first hash value, uses that second firmware volume to provide a BIOS.

20 Claims, 8 Drawing Sheets

ADJUSTABLE PERFORMANCE BOOT SYSTEM

BACKGROUND

The present disclosure relates generally to information handling systems, and more particularly to an adjustable performance boot system in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, include boot systems that operate to perform the boot operations that initialize the server device. For example, the boot system in some server devices utilizes a Central Processing Unit (CPU), a Serial Peripheral Interface (SPI) flash memory that is coupled to the CPU via a SPI interface and that stores firmware volumes that are configured to provide a Basic Input Output System (BIOS), and a host memory that is coupled to the CPU via a host memory interface. Such boot systems typically perform boot operations that include the CPU retrieving the firmware volumes from the SPI flash memory via the SPI interface, providing those firmware volumes on the host memory via the host memory interface, and utilizing those firmware volumes to provide a BIOS that is configured to complete the boot operations and initialize the server device so that the server device may enter a runtime state. However emerging technologies have raised some issues with regard to conventional techniques for retrieving firmware volumes from the SPI flash memory via the SPI interface.

For example, some server device platforms now provide different modes and speeds for transmitting data via the SPI interface. In a specific example, server devices that utilize processing systems available from Advanced Micro Device (AMD)®, Inc. of Santa Clara, Calif., United States, may provide a single mode, a dual mode, and a quad Input/Output (IO) mode, as well as 16.5 MHz, 33 MHz, 66 MHz, and 100 MHz speeds within each of those modes for transmitting data via the SPI interface. However, it has been found that as the performance level associated with the mode and speed of the transmission of data via the SPI interface increases (e.g., to provide higher speed data transmission via the SPI interface), the less reliable that data transmission becomes, with SPI interface data transmission errors resulting in the firmware volumes provided in the host memory having errors that prevent the provisioning of the BIOS in the server device and result in an inability to initialize the server device. While the mode and speed of data transmission via the SPI interface provided in server devices in a server device platform is often set during its development at a level that those server devices should reliably support, differences in server devices within any particular server device platform have been found to result in SPI interface data transmission errors at the mode and speed of SPI interface data transmission that was selected for their server device platform. Furthermore, some server device platforms/server devices include configuration options (e.g., setup options in a debug menu) that allow a user to change the SPI interface mode and speed (e.g., in order to verify hardware and/or firmware), and such changes can result in the SPI interface data transmission errors discussed above as well.

Accordingly, it would be desirable to provide an improved boot system.

SUMMARY

According to one embodiment, an Information Handling System (IHS) includes a host memory subsystem; and a processing system that is coupled to the host memory subsystem and that is configured to: retrieve, via a Serial Peripheral Interface (SPI) interface at a first SPI interface performance level, a first firmware volume that includes a first hash value that was previously generated by performing a hashing operation on a second firmware volume; store, in the host memory subsystem, the first firmware volume; increase the first SPI interface performance level to a second SPI interface performance level; retrieve, via the SPI interface at the second SPI interface performance level, the second firmware volume; store, in the host memory subsystem, the second firmware volume that was retrieved at the second SPI interface performance level; perform, on the second firmware volume that was retrieved at the second SPI interface performance level and stored in the host memory subsystem, the hashing operation to generate a second hash value; lower, in response to the second hash value not matching the first hash value included in the first firmware volume, the second SPI interface performance level to a third SPI interface performance level; retrieve, via the SPI interface at the third SPI interface performance level, the second firmware volume; store, in the host memory subsystem, the second firmware volume that was retrieved at the third SPI interface performance level; perform, on the second firmware volume that was retrieved at the third SPI interface performance level and stored in the host memory subsystem, the hashing operation to generate a third hash value; and use, in response to the third hash value matching the first hash value included in the first firmware volume, the second firmware volume that was retrieved at the third interface characteristics and stored in the host memory subsystem to provide a Basic Input Output System (BIOS).

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
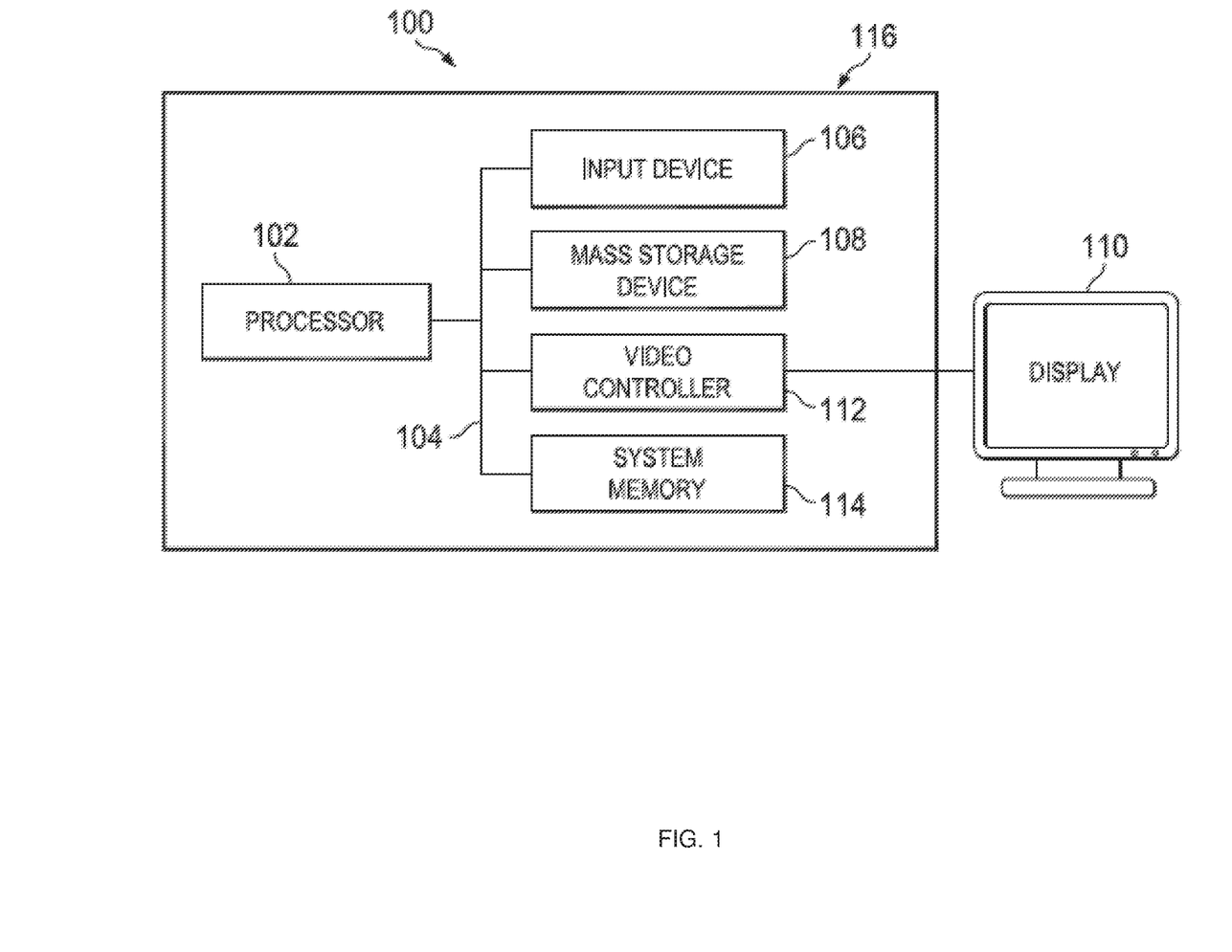
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
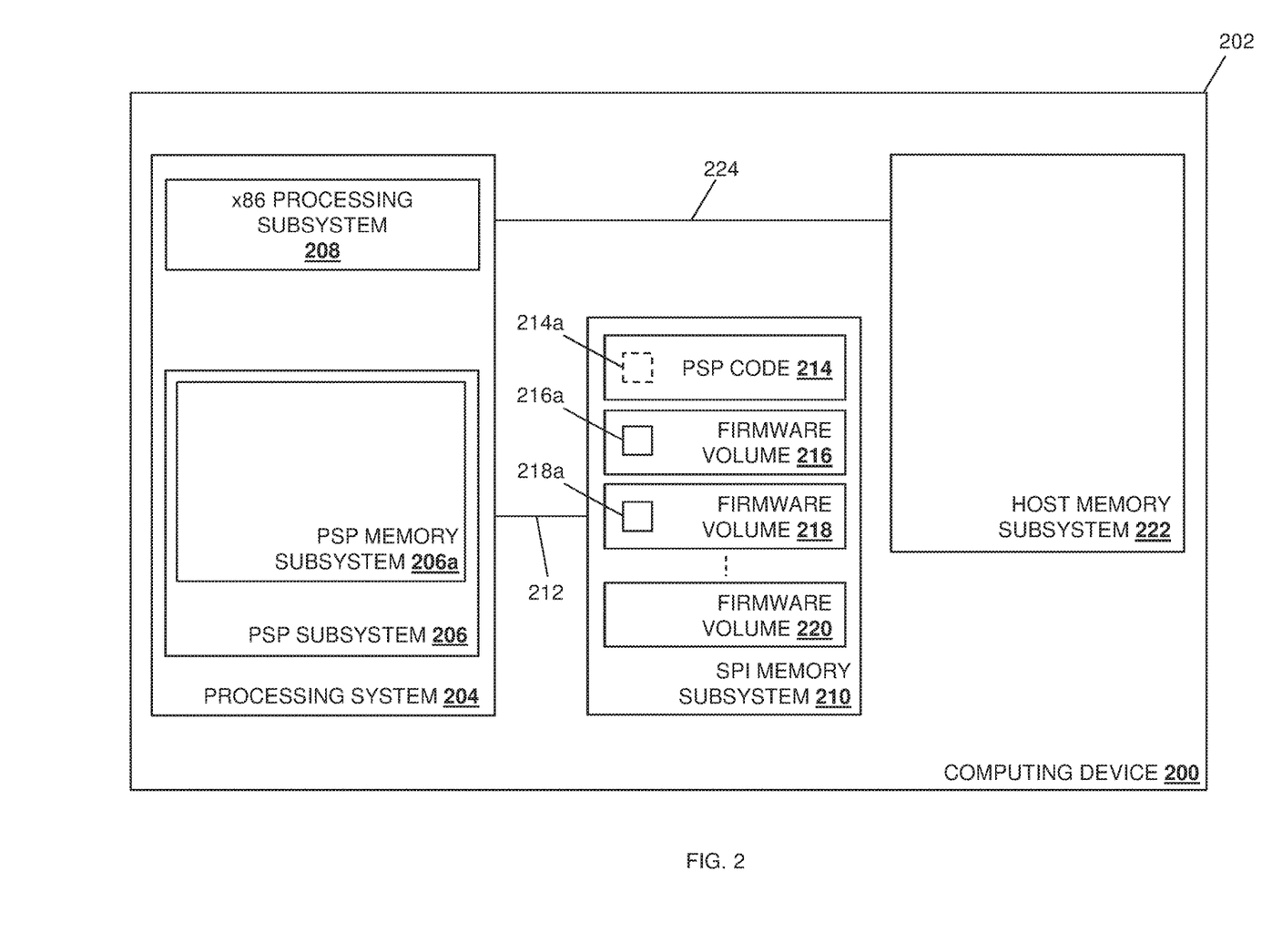
FIG. 2 is a schematic view illustrating an embodiment of a computing device that includes the adjustable performance boot system of the present disclosure.

Referring now to FIG. 2, an embodiment of a computing device 200 is illustrated that includes the adjustable performance boot system of the present disclosure, and that may be provided by the IHS 100 discussed above with reference to FIG. 1 and/or may include some or all of the components of the IHS 100. Furthermore, while illustrated and discussed as a server device in some of the embodiments below, one of skill in the art in possession of the present disclosure will recognize that the functionality of the computing device 200 discussed below may be provided by networking devices, desktop computing devices, laptop/notebook computing devices, tablet computing devices, mobile phones, and/or other computing devices that are configured to operate similarly as discussed below. In the illustrated embodiment, the computing device 200 includes a chassis 202 that houses the components of the computing device 200, only some of which are illustrated below. For example, the chassis 202 may house a processing system 204 and a memory system that is coupled to the processing system and that includes instructions that, when executed by the processing system 204, cause the processing system to perform the functionality of the processing systems and/or computing devices discussed below.

In the illustrated embodiment, the processing system 204 may be a processing system available from AMD®, Inc. of Santa Clara, Calif., United States, and includes a Platform Security Processor (PSP) system 206 including a PSP memory subsystem 206a that may be provided by, for example, a PSP Random Access Memory (RAM). As would be understood by one of skill in the art in possession of the present disclosure, a PSP subsystem 206 may provide a trusted execution environment that operates to create, monitor, and maintain a security environment in the processing system 204/computing device 200 by managing a boot process for the computing device 200, initializing security-related mechanisms in the computing device 200, monitoring the computing device 200 for suspicious activities or events and implementing appropriate responses, and/or performing other PSP functionality known in the art. However, while discussed below as a PSP subsystem, in other examples the PSP subsystem 206 may be provided by the updated AMD® Secure Processor (AMD-SP), the INTEL® management engine available from INTEL® corporation of Santa Clara, Calif., United States, and/or other secure/boot processing subsystems known in the art. In the illustrated embodiment, the processing system 204 also includes a x86 processing subsystem 208, which one of skill in the art in possession of the present disclosure will recognize may be provided by an instruction set architecture in the processing system 204 that is based on the INTEL® 8086 microprocessor and its 8088 variant (with additions and extensions that have been added in the decades since those microprocessors were introduced.) However, while a specific processing system 204 is illustrated and described, one of skill in the art in possession of the present disclosure will recognize that a variety of different processing systems having different components and/or component configurations may provide the adjustable performance boot system functionality of the present disclosure while remaining within its scope as well.

In the illustrated embodiment, the memory system in the computing device 200 includes a Serial Peripheral Interface (SPI) memory subsystem 210 that may be provided by, for example, an SPI flash memory device. The SPI memory subsystem 210 is coupled to the processing system 204 by a SPI interface 212. For example, the SPI interface 212 may be provided by an SPI Bus that connects the SPI flash memory device to the processing system 204. One of skill in the art in possession of the present disclosure will recognize that SPI flash memory devices are relatively small, lower-power flash memory devices that provide serial access to data stored thereon, and rather than addressing individual bytes, the processing system 204 may read or write contiguous groups of bytes in the address space of the SPI flash memory device serially, with the SPI Bus providing the typical protocol for access the SPI flash memory device. In the examples illustrated and described below, the SPI memory subsystem 210 stores PSP code 214, which may include or be associated with optional supplemental data 214a (e.g., the hash values and/or SPI interface performance levels discussed below, and illustrated with dashed lines to indicate that it is optional), and which may provide instructions for the PSP subsystem 206 to perform the functionality discussed below.

In the illustrated embodiment, the SPI memory subsystem 210 also stores a plurality of firmware volumes 216, 218, and up to 220. As discussed below, the firmware volumes 216-220 include instructions that are configured to be executed by the x86 processing system 208 in order to provide a Basic Input Output System (BIOS). One of skill in the art in possession of the present disclosure will recognize that the BIOS provided by the instructions included in the firmware volumes 216-220 may be provided via non-volatile firmware that is configured to perform hardware initialization during a booting process for the computing device 200, as well as provide runtime services for an operating system and/or other programs provided on the computing system 200. As would be understood by one of skill in the art in possession of the present disclosure, the BIOS may be provided as a Unified Extensible Firmware Interface (UEFI) BIOS. Thus, while UEFI is known in the art as a specification that has been provided to replace the conventional BIOS, and that defines a software interface between an operating system and platform firmware provided on computing devices, one of skill in the art in possession of the present disclosure will recognize that the discussions of the BIOS below apply to a UEFI BIOS as well.

In the examples provided below, each firmware volume in the SPI memory subsystem 210 that precedes another firmware volume (the "subsequent firmware volume") in the SPI memory subsystem 210 may include or be associated with a hash value that was generated via the performance of a hashing operation (e.g., a Secure Hash Algorithm (SHA) 256 hashing operation and/or other hashing operation known in the art) on that subsequent firmware volume and, as such, the firmware volume 216 may include or be associated with a hash value 216a that was generated via the performance of the hashing operation on the firmware volume 218, the firmware volume 218 may include or be associated with a hash value 218a that was generated via the performance of the hashing operation on its subsequent firmware volume, and so on. However, while the hash values discussed above are illustrated and described and being included in the firmware volumes, in some examples those hash values may be stored separately from the firmware volumes (in the SPI memory subsystem 210, in a storage device (not illustrated) that is separate from the SPI memory subsystem 210 and accessible to the processing system 204, etc.) while remaining within the scope of the present disclosure as well. Furthermore, in some of the examples below, the firmware volume 216 may include or be associated with an SPI interface performance level that, as discussed below, may identify to the processing system 204 the highest SPI interface performance level available for the SPI interface 212, the highest SPI interface performance level that is reliably supported by the computing device 200, etc.

In the illustrated embodiment, the memory system in the computing device 200 also includes a host memory subsystem 222 that may be provided by, for example, Dynamic Random Access Memory (DRAM) devices and/or other memory devices that would be apparent to one of skill in the art in possession of the present disclosure. The host memory subsystem 222 is coupled to the processing system 204 via a host memory interface 224. While a specific computing device 200 has been illustrated, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3A:
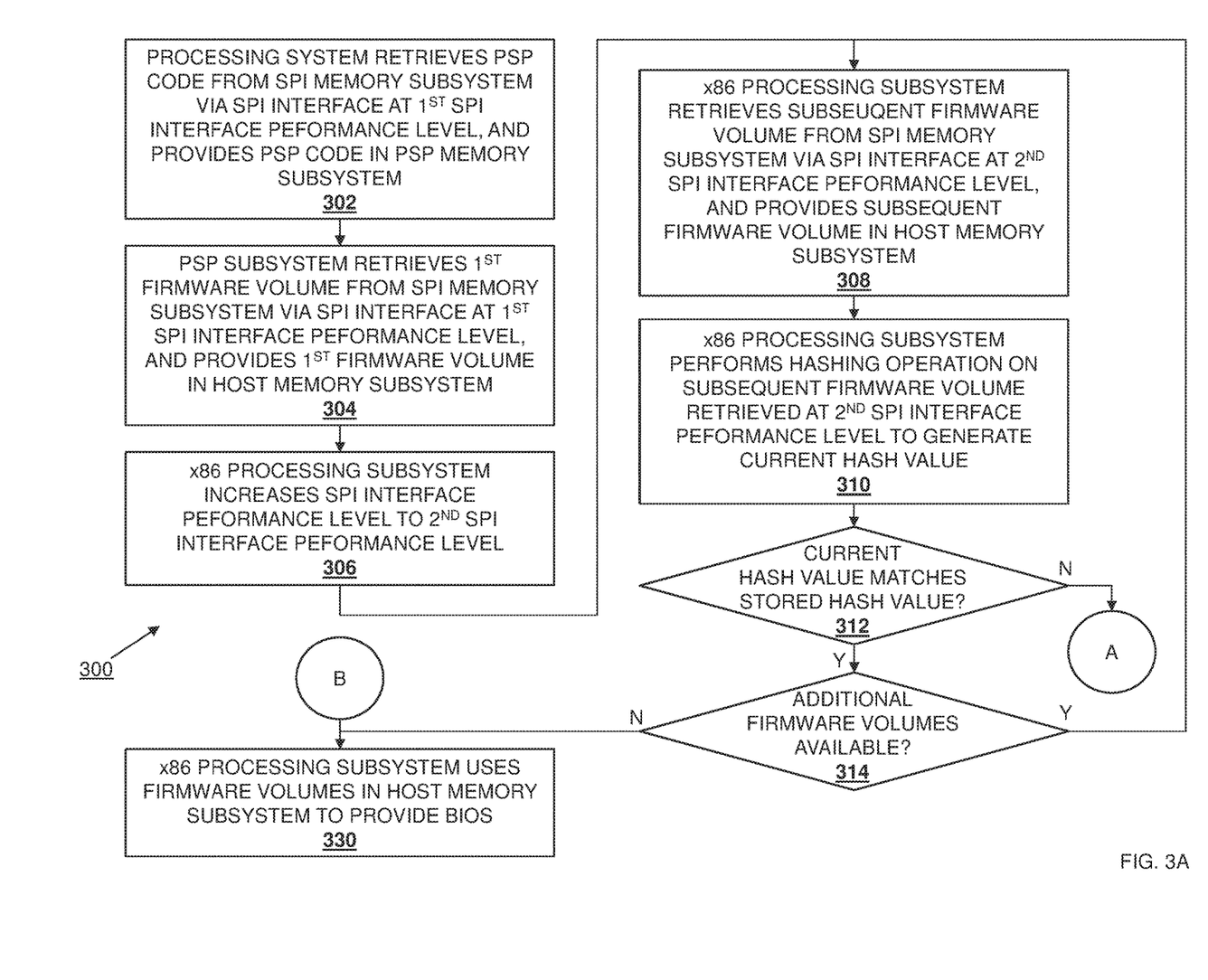
FIG. 3A is a flow chart illustrating an embodiment of a portion of a method for adjusting the performance of a boot system.
Figure 3B:
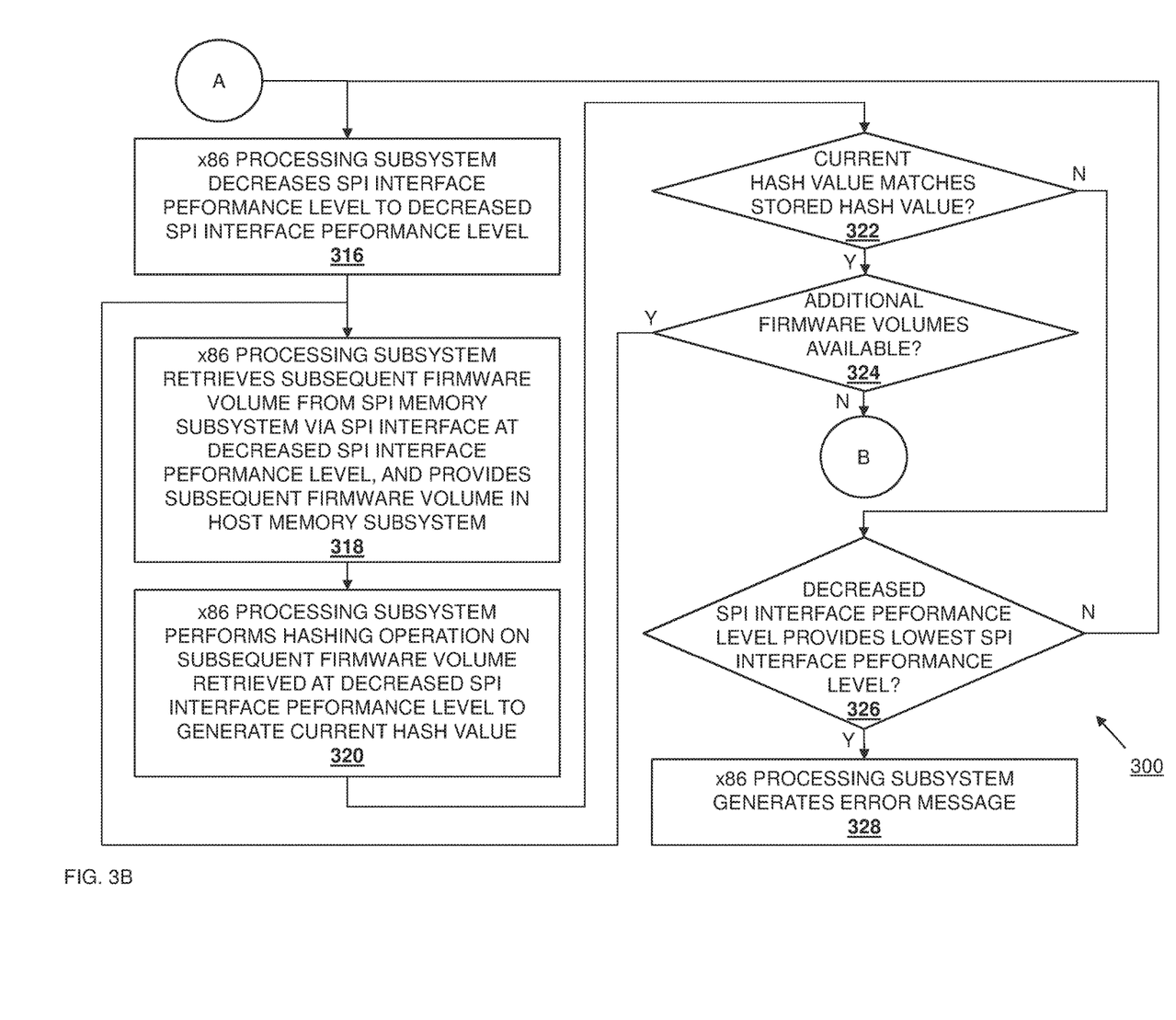
FIG. 3B is a flow chart illustrating an embodiment of a portion of a method for adjusting the performance of a boot system.

Referring now to FIGS. 3A and 3B, an embodiment of a method for adjusting the performance of a boot system is illustrated. As discussed below, the systems and methods of the present disclosure provide for a more robust boot process than is available in conventional boot systems while maintaining the maximum available performance of that boot process, which may be accomplished via a processing system in a computing device that retrieves a first firmware volume via an SPI interface from an SPI memory subsystem and provides that first firmware volume on a host memory subsystem. The processing system may then increase a performance level of the SPI interface to the highest performance level supported by the computing device, retrieve a second firmware volume via the SPI interface from the SPI memory subsystem and provide that second firmware volume on the host memory subsystem, and perform a hashing operation on that second firmware volume to generate a current hash value. If the processing subsystem determines that the first hash value does not match a stored hash value that was previously generated using that second firmware volume (which is indicative that the second firmware volume was corrupted during its retrieval via the SPI interface at the highest performance level supported by the computing device), the processing system may then decrease the performance level of the SPI interface to a lower performance level and again retrieve the second firmware volume, generate a new current hash value using that second firmware volume, and determine whether that new current hash value matches the stored hash value.

This adjustable performance boot process may be repeated until a current hash value generated using the second firmware volume that was retrieved at some decreased SPI interface performance level matches the stored hash value (which is indicative of a successful retrieval of the second firmware volume via the SPI interface at that decreased SPI interface performance level), or the SPI interface performance level is decreased to the lowest available SPI interface performance level without a successful retrieval of the second firmware volume via the SPI interface, in which case an error message is generated. Furthermore, the adjustable performance boot process may be repeated for each subsequent firmware volume in the SPI memory subsystem until either all of those firmware volumes are successfully retrieved from the SPI memory subsystem for use in providing a BIOS, or one of those firmware volumes cannot be retrieved successfully and an error message is generated. As such, the systems and methods of the present disclosure provide the ability to attempt to retrieve each firmware volume from the SPI memory subsystem via the SPI interface at the highest supported SPI interface performance level to provide a boot process with maximized performance, while reducing the SPI interface performance level incrementally when SPI interface firmware volume retrieval errors are encountered until the associated firmware volume is retrieved successfully, providing a robust boot process that maximizes boot system performance available in a computing device.

Figure 4A:
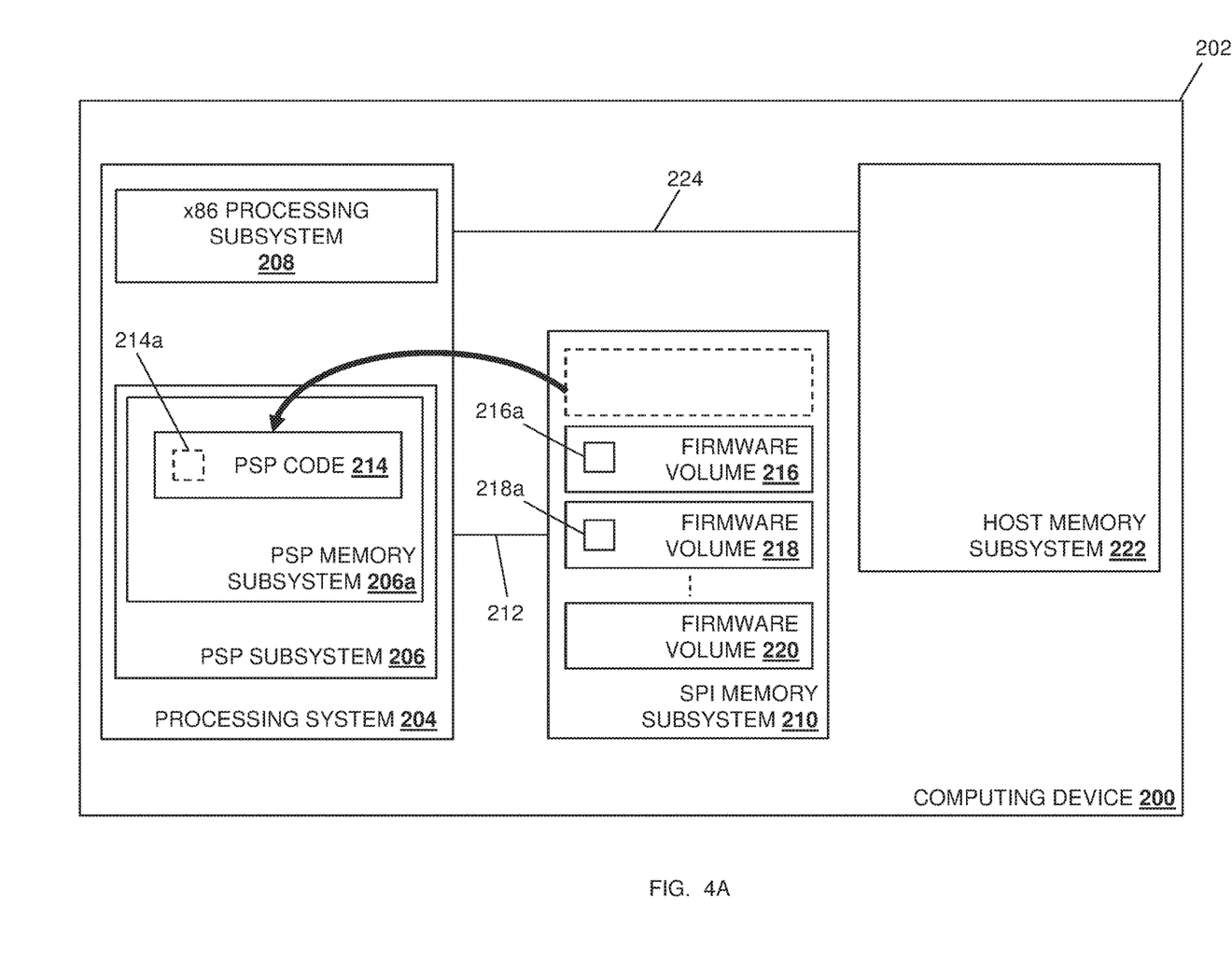
FIG. 4A is a schematic view illustrating an embodiment of the operations of the adjustable performance boot system in the computing device of FIG. 2 during the method of FIG. 3.

The method 300 begins at block 302 where a processing system retrieves PSP code from an SPI memory subsystem via a SPI interface at a first SPI interface performance level, and provides the PSP code in a PSP memory subsystem. In an embodiment, at or prior to block 302, the computing device 200 may be powered on, started up, reset, re-booted, and/or otherwise initialized in order to begin a boot process. In an embodiment, when that boot process begins, the SPI memory subsystem 210 may be powered on, and an SPI interface performance level of the SPI interface 212 may be set to a relatively low level. Using the example of the available SPI interface performance levels discussed above, at the beginning of the boot process, the first SPI interface data performance level may be set to provide the single mode at 16.5 MHz speed, i.e., the lowest SPI interface performance level available for the SPI interface 212 in this example. However, while an example of initially providing the lowest SPI interface performance level for the SPI interface 212 is provided, one of skill in the art in possession of the present disclosure will recognize that intermediate SPI interface performance levels or, in some cases, the highest available SPI interface performance level, may be utilized at block 302 while remaining within the scope of the present disclosure as well. As such, at block 302, the processing system 204 operates to retrieve the PSP code 214 from the SPI memory subsystem 210 via the SPI interface 212 at the first SPI interface performance level, and provides that PSP code 214 in the PSP memory subsystem 206a (e.g., a PSP RAM), as illustrated in FIG. 4A.

As would be understood by one of skill in the art in possession of the present disclosure, the size of the PSP code 214 may be relatively small, allowing for a relatively low SPI interface performance level for the SPI interface 212 to still provide for the retrieval of the PSP code 214 via the SPI interface 212 in a relatively short amount of time while also ensuring that the PSP code 214 is successfully retrieved via the SPI interface 212 without errors. One of skill in the art in possession of the present disclosure will recognize that the provisioning of the PSP code 214 in the PSP memory subsystem 206a allows the PSP subsystem 206 to utilize the PSP code 214 in order to perform the PSP subsystem functionality discussed below. As such, the first SPI interface performance level may be the lowest available SPI interface performance level (or a relatively low SPI interface performance level) to ensure (or provide a relatively high probability that) that the PSP code 214 will be retrieved successfully (e.g., without errors or corruption) so that the PSP subsystem 206 will operate as discussed below. Furthermore, in addition to performing the operations discussed below, the PSP subsystem 206 may perform computing device configuration operations such as, for example, dis-covering the host memory subsystem 222, configuring a communications fabric for the computing device 222, and/or performing a variety of other PSP subsystem operations that would be apparent to one of skill in the art in possession of the present disclosure.

Figure 4B:
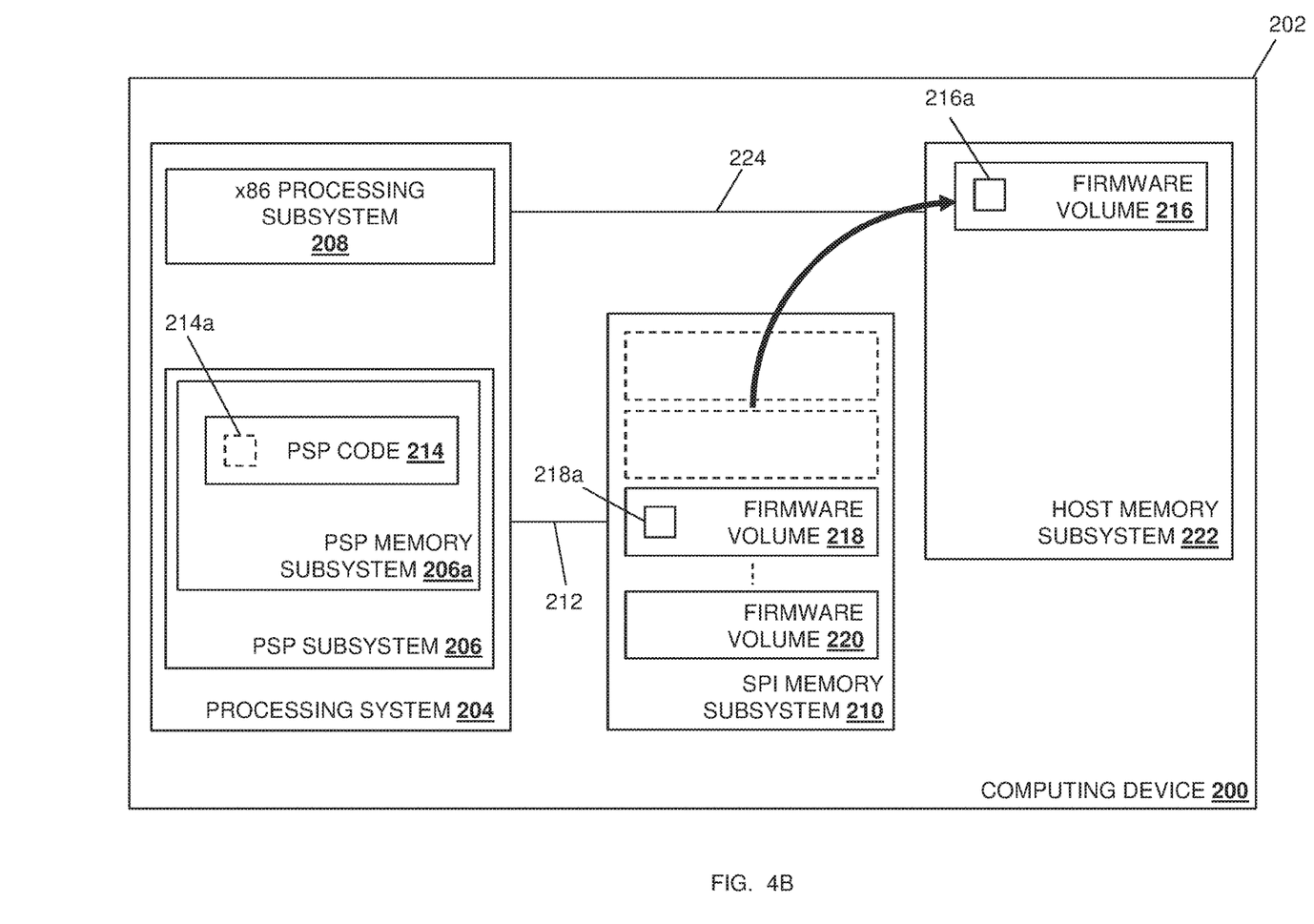
FIG. 4B is a schematic view illustrating an embodiment of the operations of the adjustable performance boot system in the computing device of FIG. 2 during the method of FIG. 3.

The method 300 then proceeds to block 304 where a PSP subsystem retrieves a first firmware volume from the SPI memory subsystem via the SPI interface at the first SPI interface performance level, and provides the first firmware volume in a host memory system. In an embodiment, at block 304, the PSP subsystem 206 may operate to retrieve the firmware volume 216 from the SPI memory subsystem 210 via the SPI interface 212 at the first SPI interface performance level, and provide that firmware volume 216 in the host memory subsystem 222 via the host memory interface 224, as illustrated in FIG. 4B. Similarly as discussed above with the PSP code 214, the size of the firmware volume 216 may be relatively small (e.g., 64 KB, as compared to the firmware volumes 218-220 that may have sizes on the order of MBs), allowing for a relatively low SPI interface performance level for the SPI interface 212 to still provide for the retrieval of the firmware volume 216 via the SPI interface 212 in a relatively short amount of time while also ensuring that the firmware volume 216 is successfully retrieved via the SPI interface 212 without errors. While illustrated and described as being retrieved at the same SPI interface performance level as the PSP code 214, in some embodiments, the firmware volume 216 may be retrieved at a different SPI interface performance level than the PSP code 214 while remaining within the scope of the present disclosure. For example, the optional supplemental data 214a in the PSP code 214 may identify an SPI interface performance level at which the firmware volume 216 should be retrieved, and at block 304 the PSP subsystem 206 may change the SPI interface performance level to that identified in the optional supplemental data 214a before retrieving the firmware volume 216 via the SPI interface 212 at that SPI interface performance level. Furthermore, while discussed as being provided in the PSP code 214, the SPI interface performance level at which the firmware volume 216 should be retrieved may be provided in a different storage device or location accessible to the PSP subsystem 206 while remaining within the scope of the present disclosure as well.

However, in some examples and similarly to the PSP code 214, the first SPI interface performance level may be the lowest available SPI interface performance level (or a relatively low SPI interface performance level) to ensure (or provide a relatively high probability that) that the firmware volume 216 is successfully retrieved. (e.g., without errors or corruption) Furthermore, the optional supplemental data 214a in the PSP code 214 may include a stored hash value that was previously generated by performing a hashing operation (e.g., a SHA-256 hashing operation) on the firmware volume 216, and at block 304 the PSP subsystem 206 may perform that hashing operation the firmware volume 216 that was retrieved at the first SPI interface performance level and provided in the host memory subsystem 222 in order to generate a current hash value, and compare that current hash value to the stored hash value. As would be understood by one of skill in the art in possession of the present disclosure, if the current hash value does not match the stored hash value, that is indicative that the errors were introduced during the retrieval of the firmware volume 216 via the SPI interface 212 at the first SPI interface performance level such that the firmware volume 216 is corrupted, and may require a replacement of the firmware volume 216 in the SPI memory subsystem 210. However, as would be understood by one of skill in the art in possession of the present disclosure, the first SPI interface performance level is often selected at such a relatively low SPI interface performance level that errors associated with the retrieval of the firmware volume 216 at that relatively low SPI interface performance level are rare. Furthermore, while discussed as being provided in the PSP code 214, the stored hash value used to verify the successful retrieval of the firmware volume 216 may be provided in a different storage device or location accessible to the PSP subsystem 206 while remaining within the scope of the present disclosure as well.

The method 300 then proceeds to block 306 where an x86 processing subsystem increases the SPI interface performance level to second SPI interface performance level. In an embodiment, at block 306 and following the provisioning of the firmware volume 216 in the host memory subsystem 222, one of skill in the art in possession of the present disclosure will recognize that the x86 processing subsystem 208 may use the firmware volume 216 in the host memory subsystem 222 in order to provide a BIOS that performs the x86 processing subsystem functionality discussed below. As such, at block 306, the x86 processing subsystem 208 may operate to increase the SPI interface performance level to a second SPI interface performance level. Using the example of the available SPI interface performance levels discussed above, the first SPI interface data performance level may be increased to provide a second SPI interface performance level that provides the quad I/O mode at 100 MHz speed, i.e., the highest SPI interface performance level available for the SPI interface 212 in this example.

However, while an example of providing the highest SPI interface performance level for the SPI interface 212 for the retrieval of the firmware volume 218 is provided, one of skill in the art in possession of the present disclosure will recognize that intermediate SPI interface performance levels may be utilized at block 306 while remaining within the scope of the present disclosure as well. For example and as discussed above, during the development of many computing device platforms, testing may be performed to identify the highest SPI interface performance level that may be reliably supported by computing devices in that computing device platform and, at block 306, the x86 processing subsystem 208 may operate to increase the SPI interface performance level to that SPI interface performance level. Furthermore, as discussed above, the firmware volume 216 may include or be associated with the highest SPI interface performance level that may be reliably supported by the computing device 200, and at block 306 the x86 processing subsystem 208 may identify that SPI interface performance level, and increase the first SPI interface performance level to that SPI interface performance level. Further still, while discussed as being included in or associated with the firmware volume 216, the highest SPI interface performance level that may be reliably supported by the computing device 200 may be provided in a different storage device or location accessible to the x86 processing subsystem 208 while remaining within the scope of the present disclosure as well.

Figure 4C:
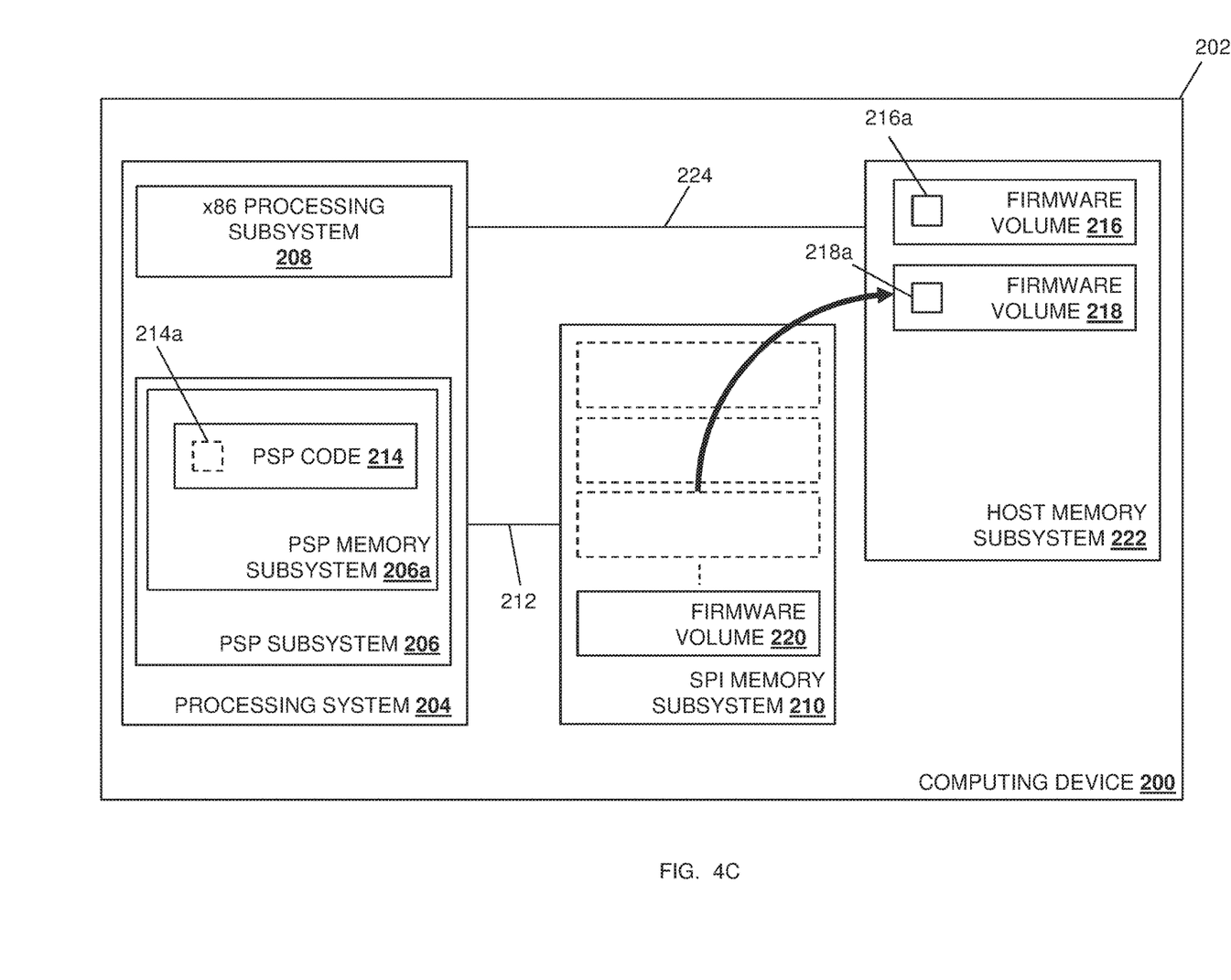
FIG. 4C is a schematic view illustrating an embodiment of the operations of the adjustable performance boot system in the computing device of FIG. 2 during the method of FIG. 3.

The method 300 then proceeds to block 308 where the x86 processing subsystem retrieves a subsequent firmware volume from the SPI memory subsystem via the SPI interface at the second SPI interface performance level, and provides the subsequent firmware volume in the host memory system. In an embodiment, at block 308, the x86 processing subsystem 208 may operate to retrieve the firmware volume 218 from the SPI memory subsystem 210 via the SPI interface 212 at the second SPI interface performance level, and provide that firmware volume 218 in the host memory subsystem 222 via the host memory interface 224, as illustrated in FIG. 4C. As discussed above, the size of the firmware volume 218 may be relatively larger (e.g., on the order of MBs, as opposed to the 64 KB firmware volume 216), thus calling for the highest SPI interface performance level for the SPI interface 212 that can provide for the successful retrieval of the firmware volume 218 via the SPI interface 212 (e.g., with no errors or corruption) in shortest amount of in order to minimize the time needed to perform this portion of the boot process.

The method 300 then proceeds to block 310 where the x86 processing subsystem performs a hashing operation on the subsequent firmware volume that was retrieved at the second SPI interface performance level to generate a current hash value. In an embodiment, at block 310, the x86 processing subsystem 208 may perform the hashing operation on the firmware volume 218 that was retrieved at the second SPI interface performance level and provided in the host memory subsystem 222 in order to generate a current hash value associated with the firmware volume 218 that was retrieved at the second SPI interface performance level.

The method 300 then proceeds to decision block 312 where the x86 processing subsystem determines whether the current hash value matches a stored hash value. In an embodiment, at decision block 312, the x86 processing subsystem 208 may compare the current hash value associated with the firmware volume 218 that was retrieved at the second SPI interface performance level to a stored hash value. As discussed above, the hash value 216a included in or associated with the firmware volume 216 may have been previously generated by performing the hashing operation on the firmware volume 218 (e.g., an uncorrupted/error-free version of the firmware volume 218), and may be utilized as the stored hash value at decision block 312. However, while discussed as being included in or associated with the firmware volume 216, the hash value 216a that provides the stored hash value may be provided in a different storage device or location accessible to the x86 processing subsystem 208 while remaining within the scope of the present disclosure as well.

If, at decision block 312, it is determined that the current hash value matches the stored hash value, the method 300 proceeds to decision block 314 where the x86 processing subsystem determines whether additional firmware volumes are available. In an embodiment, at decision block 314 and in response to a successful retrieval of the firmware volume 218 at the second SPI interface performance level, the x86 processing subsystem 208 may determine whether there are any additional firmware volumes available in the SPI memory subsystem 210. Continuing with the illustrated example, at block 312 the x86 processing subsystem 208 may determine that the remaining firmware volume(s) up to firmware volume 220 are available in the SPI memory subsystem 210.

Figure 4D:
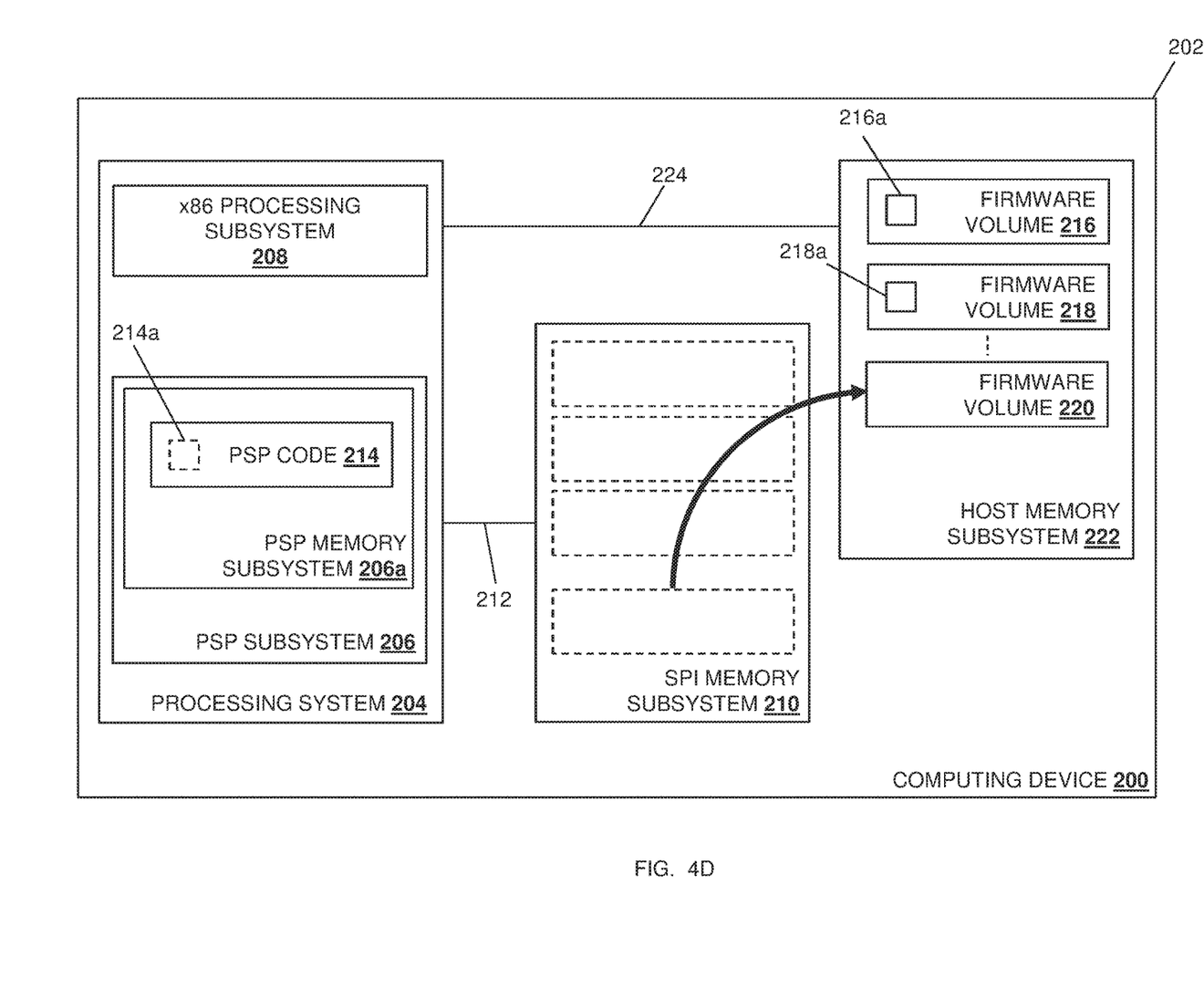
FIG. 4D is a schematic view illustrating an embodiment of the operations of the adjustable performance boot system in the computing device of FIG. 2 during the method of FIG. 3.

If, at decision block 314, it is determined that additional firmware volumes are available, the method 300 returns to block 308 where the x86 processing subsystem retrieves a new subsequent firmware volume from the SPI memory subsystem via the SPI interface at the second SPI interface performance level and provides that new subsequent firmware volume in the host memory system, block 310 where the x86 processing subsystem performs the hashing operation on that new subsequent firmware volume that was retrieved at the second SPI interface performance level to generate a new current hash value, and decision block 312 where the x86 processing subsystem determines whether the new current hash value matches a stored hash value. Continuing with the illustrated example, the method 300 returns to block 308 where the x86 processing subsystem retrieves the firmware volume 220 from the SPI memory subsystem 210 via the SPI interface 212 at the second SPI interface performance level and provides that firmware volume 220 in the host memory system 222, as illustrated in FIG. 4D, block 310 where the x86 processing subsystem performs the hashing operation on that firmware volume 220 that was retrieved at the second SPI interface performance level to generate a new current hash value, and decision block 312 where the x86 processing subsystem determines whether the new current hash value matches the stored hash value 218a in the firmware volume 218. As such, the method 300 may loop through blocks 308, 310, 312, and 314 to retrieve firmware volumes (e.g., up to the firmware volume 220) from the SPI memory subsystem 210 at the second SPI interface performance level and confirm that the hash values generated for those firmware volumes match the stored hash values (e.g., included in their respective previous firmware volumes, stored in a storage device or location accessible to the x86 processing system 208, etc.)

If, at decision block 312, it is determined that a current hash value does not match a stored hash value, the method 300 proceeds to block 316 where the x86 processing subsystem decreases the SPI interface performance level to a decreased SPI interface performance level. In some embodiments, in response to determining at block 312 that a current hash value does not match a stored hash a value, the x86 processing subsystem 208 may operate to remove the firmware volume associated with that current hash value from the host memory subsystem 222, mark the firmware volume associated with that current hash value as corrupted in the host memory subsystem, and/or perform other actions that would be apparent to one of skill in the art in possession of the present disclosure as indicating that the firmware volume associated with that current hash value should not be utilized in providing the BIOS discussed below. As such, continuing with the illustrated example, the x86 processing subsystem 208 may remove the firmware volume 218 from the host memory subsystem 222, mark the firmware volume 218 as corrupted in the host memory subsystem 222, and/or otherwise perform actions that indicate that the firmware volume 218 that was retrieved at the second SPI interface performance level should not be utilized in providing the BIOS discussed below.

In an embodiment, at block 316, the x86 processing subsystem 208 may operate to decrease the SPI interface performance level to a decreased SPI interface performance level. Using the example of the available SPI interface performance levels discussed above (i.e., in which the second SPI interface performance level was provided in the quad I/O mode at 100 MHz speed), the second SPI interface performance level may be decreased to provide a decreased SPI interface performance level that provides the quad I/O mode at 66 MHz, 33 MHz, or 16.5 MHz speed; the dual mode at 100 MHz, 66 MHz, 33 MHz, or 16.5 MHz speed; or the single mode at 100 MHz, 66 MHz, or 33 MHz speed. As would be understood by one of skill in the art in possession of the present disclosure, the decreased SPI interface performance level may be selected by changing the mode and/or speed associated with the existing SPI interface performance level in order to reduce that existing performance level in a manner that will reduce the probability of errors introduced by the retrieval of the firmware volume from the SPI interface 212 at that SPI interface performance level. As such, while incremental decreases of the SPI interface performance level (e.g., reductions of speed within a particular mode, followed by reductions of modes a lowest speed available to a particular mode is reached) may be performed, larger decreases of the SPI interface performance level (mode decreases such as a reduction from quad I/O mode at 66 MHZ speed to dual mode at 66 Mhz speed) will fall within the scope of the present disclosure as well. In response to decreasing the SPI interface performance level, the x86 processing system 208 may operate to provide an indication (e.g., by setting a flag "SPI_interface_decrease") that the SPI interface performance level of the SPI interface 212 is not at an optimized mode/maximum speed that should be supported by the computing device 200 (e.g., as determined during the development of that computing device platform for the computing device 200 as discussed above.)

The method 300 then proceeds to block 318 where the x86 processing subsystem retrieves a subsequent firmware volume from the SPI memory subsystem via the SPI interface at the decreased SPI interface performance level, and provides the subsequent firmware volume in the host memory system. In an embodiment, at block 318, the x86 processing subsystem 208 may operate to retrieve the firmware volume 218 from the SPI memory subsystem 210 via the SPI interface 212 at the decreased SPI interface performance level, and provide that firmware volume 218 in the host memory subsystem 222 via the host memory interface 224, as illustrated in FIG. 4C. As discussed above, the copy of the firmware volume 218 that was retrieved at the second SPI interface performance level may have been removed from the host memory subsystem 222, marked as corrupted in the host memory subsystem 222, etc., in response to its unsuccessful retrieval at the second SPI interface performance level, and thus the retrieval of the firmware volume 218 again at the decreased SPI interface performance level is performed in the hopes that the reduced SPI interface performance level will provide a successful retrieval of the firmware volume 218 with no errors/corruption.

The method 300 then proceeds to block 320 where the x86 processing subsystem performs the hashing operation on the subsequent firmware volume that was retrieved at the decreased SPI interface performance level to generate a current hash value. In an embodiment, at block 320, the x86 processing subsystem 208 may perform the hashing operation on the firmware volume 218 that was retrieved at the decreased SPI interface performance level and provided in the host memory subsystem 222 in order to generate a current hash value associated with the firmware volume 218 that was retrieved at the decreased SPI interface performance level.

The method 300 then proceeds to decision block 322 where the x86 processing subsystem determines whether the new current hash value matches a stored hash value. In an embodiment, at decision block 322, the x86 processing subsystem 208 may compare the current hash value associated with the firmware volume 218 that was retrieved at the decreased SPI interface performance level to a stored hash value. As discussed above, the hash value 216a included in or associated with the firmware volume 216 may have been previously generated by performing the hashing operation on the firmware volume 218 (e.g., an uncorrupted/error-free version of the firmware volume 218), and may be utilized as the stored hash value at decision block 322. However, while discussed as being included in or associated with the firmware volume 216, the hash value 216a that provides the stored hash value may be provided in a different storage device or location accessible to the x86 processing subsystem 208 while remaining within the scope of the present disclosure as well If, at decision block 322, it is determined that the current hash value matches the stored hash value, the method 300 proceeds to decision block 324 where the x86 processing subsystem determines whether additional firmware volumes are available. In an embodiment, at decision block 324 and in response to a successful retrieval of the firmware volume 218 at the decreased SPI interface performance level, the x86 processing subsystem 208 may determine whether there are any additional firmware volumes available in the SPI memory subsystem 210. Continuing with the illustrated example, at block 312 the x86 processing subsystem 208 may determine that the remaining firmware volume(s) up to firmware volume 220 are available in the SPI memory subsystem 210.

If, at decision block 324, it is determined that additional firmware volumes are available, the method 300 returns to block 318 where the x86 processing subsystem retrieves a new subsequent firmware volume from the SPI memory subsystem via the SPI interface at the decreased SPI interface performance level and provides that new subsequent firmware volume in the host memory system, block 320 where the x86 processing subsystem performs the hashing operation on that new subsequent firmware volume that was retrieved at the decreased SPI interface performance level to generate a new current hash value, and decision block 322 where the x86 processing subsystem determines whether the new current hash value matches a stored hash value. Continuing with the illustrated example, the method 300 returns to block 318 where the x86 processing subsystem retrieves the firmware volume 220 from the SPI memory subsystem 210 via the SPI interface 212 at the decreased SPI interface performance level and provides that firmware volume 220 in the host memory system 222, as illustrated in FIG. 4D, block 320 where the x86 processing subsystem performs the hashing operation on that firmware volume 220 that was retrieved at the decreased SPI interface performance level to generate a new current hash value, and decision block 322 where the x86 processing subsystem determines whether the new current hash value matches the stored hash value 218a in the firmware volume 218. As such, the method 300 may loop through blocks 318, 320, 322, and 324 to retrieve firmware volumes (e.g., up to the firmware volume 220) from the SPI memory subsystem 210 at the decreased SPI interface performance level as long as the hash values generated for those firmware volumes match the stored hash values (e.g., included in their respective previous firmware volumes, stored in a storage device or location accessible to the x86 processing system 208, etc.)

If, at decision block 322, it is determined that a current hash value does not match a stored hash value, the method 300 proceeds to decision block 326 where the x86 processing subsystem determines whether the decreased SPI interface performance level provides the lowest SPI interface performance level. In an embodiment, at decision block 326, the x86 processing subsystem 208 may determine whether the current decreased SPI interface performance level is the lowest available SPI interface performance level for the SPI interface 212. Using the example of the available SPI interface performance levels discussed above, the x86 processing subsystem 208 may determine whether the current decreased SPI interface performance level is provided at the single mode at 16.5 MHz speed and, if not, the x86 processing subsystem 208 will determine that the current decreased SPI interface performance level is not at its lowest available SPI interface performance level for the SPI interface 212.

If, at decision block 326, it is determined that the decreased SPI interface performance level provide the lowest SPI interface performance level, the method 300 proceeds to block 328 where the x86 processing subsystem generates an error message. In an embodiment, at block 328 and in response to determining that the current decreased SPI interface performance level is at its lowest available SPI interface performance level (e.g., the single mode at 16.5 MHz speed in the example above), the x86 processing subsystem 208 may generate an error message and provide that error message for display to a user. As would be understood by one of skill in the art in possession of the present disclosure, the unsuccessful retrieval of a firmware volume at the lowest available SPI interface performance level may be indicative of an inability to successfully provide a BIOS for the computing device 200 that will complete initialization of the computing device 200 and, as such, the error message that is generated and provided for display to the user may indicate that new/uncorrupted firmware volumes are required for the computing device 200, and/or that a boot recovery process is otherwise required. However, while a specific example has been provided, one of skill in the art in possession of the present disclosure will recognize that the error message generated at block 328 may provide a variety of information that will fall within the scope of the present disclosure as well.

If, at decision block 326, it is determined that the decreased SPI interface performance level does not provide the lowest SPI interface performance level, the method 300 returns to block 316 where the x86 processing subsystem decreases the SPI interface performance level to a further decreased SPI interface performance level, block 318 where the x86 processing subsystem retrieves a subsequent firmware volume from the SPI memory subsystem via the SPI interface at the further decreased SPI interface performance level and provides that subsequent firmware volume in the host memory system, block 320 where the x86 processing subsystem performs the hashing operation on that subsequent firmware volume that was retrieved at the further decreased SPI interface performance level to generate a new current hash value, and decision block 322 where the x86 processing subsystem determines whether the new current hash value matches a stored hash value. As such, the method 300 may loop through blocks 316, 318, 320, 322, and 326 to decrease the SPI interface performance level any time the retrieval of a firmware volume results in a hash value that is generated for that firmware volume and that doesn't match a stored hash value, until the SPI interface performance level is the lowest SPI interface performance level that is available for the SPI interface 212.

As such, continuing with the illustrated example, the x86 processing subsystem 208 may decrease the SPI interface performance level until either all of the the firmware volumes 218-220 are successfully retrieved via the SPI interface 212 from the SPI memory subsystem 210 and provided to the host memory subsystem 222, or one of those firmware volumes cannot be retrieved via the SPI interface 212 from the SPI memory subsystem 210 at the lowest available SPI interface performance level. While subsequent firmware volumes are discussed as first being retrieved via the SPI interface 212 at the SPI interface performance level that resulted in the successful retrieval of firmware volume that immediately preceded that subsequent firmware volume (e.g., because errors resulting from the retrieval of one firmware volume via an SPI interface at a particular SPI interface performance level will likely occur if the firmware volume following it is retrieved via that SPI interface at that particular SPI interface performance level), in other embodiments the SPI interface performance level may be increased to the highest available SPI interface performance level (or the highest SPI interface performance level supported by the computing device 200) for each firmware volume before decreasing the SPI interface performance level in response to detecting unsuccessful retrievals of those firmware volumes as discussed above.

If, at decision block 314 or 324, it is determined that no additional firmware volumes are available, the method 300 proceeds to block 330 where the x86 processing subsystem uses the firmware volumes in the host memory to provide a BIOS. In an embodiment, at block 330, the x86 processing system 208 may operate to utilize the firmware volumes 216-220 that were successfully retrieved (e.g., uncorrupted and/or with no errors) from the SPI memory subsystem 210 and provided in the host memory subsystem 222 in order to provide a BIOS. As discussed above, the BIOS provided at block 330 may be a UEFI BIOS while remaining within the scope of the present disclosure as well. As would be understood by one of skill in the art in possession of the present disclosure, the BIOS provided at block 330 may operate to complete the boot process such that the computing device 200 enters a runtime state and performs a variety of runtime operations known in the art. In some embodiments, the BIOS provided at block 330 may operate (e.g., during a Power On Self Test (POST) to identify an indication provided during the method 300 (e.g., via a flag "SPI_interface_decrease") that the SPI interface performance level of the SPI interface 212 is not at an optimized mode/maximum speed that should be supported by the computing device 200 and, in response, provide a message that indicates that to a user (e.g., by displaying the current mode/speed of the current SPI interface performance level along with the mode/speed of the highest SPI interface performance level supported by the computing device 200.)

As such, the method 300 may loop through blocks 316-328 to retrieve firmware volumes from the SPI memory subsystem via the SPI interface and, if a hash value generated from any firmware volume doesn't match a stored hash value for that firmware volume, the SPI interface performance level for the SPI interface is decreased until either all the firmware volumes have been retrieved such that a hash value generated from those firmware volumes matches an associated stored hash value for that firmware volume (in which case those firmware volumes may be used to provide a BIOS), or the SPI interface performance level for the SPI interface have been decreased to their lowest available level with at least one firmware volume remaining un-retrieved (in which case an error message is generated.)

Thus, systems and methods have been described that provide a robust boot process that maintains the maximum available performance of the boot system, which in some embodiments is accomplished via a x86 processing subsystem that retrieves a first firmware volume via an SPI interface from SPI flash memory and provides that first firmware volume on host memory. The x86 processing subsystem may then increase an SPI interface performance level of the SPI interface to the highest supported SPI interface performance level, retrieve a second firmware volume via the SPI interface from the SPI flash memory and provide that second firmware volume on the host memory, and perform a hashing operation on that second firmware volume to generate a current hash value. If the x86 processing subsystem determines that the first hash value does not match a stored hash value that was previously generated using that second firmware volume (which is indicative that the second firmware volume was corrupted during its retrieval via the SPI interface at the highest supported SPI interface performance level), the processing system may then decrease the performance level of the SPI interface to a lower SPI interface performance level and again retrieve the second firmware volume, generate a new current hash value using that second firmware volume, and determine whether that new current hash value matches the stored hash value.

This adjustable performance boot process may be repeated until a current hash value generated using the second firmware volume that was retrieved at some decreased SPI interface performance level matches the stored hash value (which is indicative of a successful retrieval of the second firmware volume via the SPI interface at that decreased SPI interface performance level), or the SPI interface performance level is decreased to the lowest available SPI interface performance level without a successful retrieval of the second firmware volume via the SPI interface, in which case an error message is generated. Furthermore, the adjustable performance boot process may be repeated for each subsequent firmware volume in the SPI memory subsystem until either all of those firmware volumes are successfully retrieved from the SPI flash memory for use in providing a UEFI BIOS, or one of those firmware volumes cannot be retrieved successfully and an error message is generated. As such, the systems and methods of the present disclosure provide the ability to attempt to retrieve each firmware volume from the SPI flash memory via the SPI interface at the highest supported SPI interface performance level to provide a boot process with maximized performance, while reducing the SPI interface performance level incrementally when SPI interface firmware volume retrieval errors are encountered until the associated firmware volume is retrieved successfully, providing a robust boot process that maximizes boot system performance available in a computing device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An adjustable performance boot system, comprising:
   a Serial Peripheral Interface (SPI) memory subsystem storing a plurality of firmware volumes; and
   a processing system that is coupled to the SPI memory subsystem via an SPI interface, wherein the processing system is configured to:
   retrieve, from the SPI memory subsystem via the SPI interface at a first SPI interface performance level, a first firmware volume of the plurality of firmware volumes that includes a first hash value that was previously generated by performing a hashing operation on a second firmware volume of the plurality of firmware volumes;
   increase the first SPI interface performance level to a second SPI interface performance level;
   retrieve, from the SPI memory subsystem via the SPI interface at the second SPI interface performance level, the second firmware volume;

perform, on the second firmware volume that was retrieved at the second SPI interface performance level, the hashing operation to generate a second hash value;
lower, in response to the second hash value not matching the first hash value included in the first firmware volume, the second SPI interface performance level to a third SPI interface performance level;
retrieve, from the SPI memory subsystem via the SPI interface at the third SPI interface performance level, the second firmware volume;
perform, on the second firmware volume that was retrieved at the third SPI interface performance level, the hashing operation to generate a third hash value; and
use, in response to the third hash value matching the first hash value included in the first firmware volume, the second firmware volume that was retrieved at the third SPI interface performance level to provide a Basic Input Output System (BIOS).

2. The system of claim 1, wherein the first SPI interface performance level include a first SPI interface mode and a first SPI interface speed, and wherein the second SPI interface performance level include:
a second SPI interface mode that provides for data transmission that is faster than the first SPI interface mode; and
a second SPI interface speed that provides for data transmission that is faster than the first SPI interface mode.

3. The system of claim 2, wherein the third SPI interface performance level include at least one of:
a third SPI interface mode that provides for data transmission that is faster than the first SPI interface mode and slower than the second SPI interface mode; and
a third SPI interface speed that provides for data transmission that is faster than the first interface mode and slower than the second SPI interface mode.

4. The system of claim 1, wherein the processing system is configured to:
lower, in response to the third hash value not matching the first hash value included in the first firmware volume, the third SPI interface performance level to a fourth SPI interface performance level;
retrieve, from the SPI memory subsystem via the SPI interface at the fourth SPI interface performance level, the second firmware volume;
perform, on the second firmware volume that was retrieved at the fourth SPI interface performance level, the hashing operation to generate a fourth hash value; and
use, in response to the fourth hash value matching the first hash value included in the first firmware volume, the second firmware volume that was retrieved at the fourth SPI interface performance level to provide the BIOS.

5. The system of claim 1, wherein the processing system is configured to:
determine, in response to the third hash value not matching the first hash value included in the first firmware volume, that the third SPI interface performance level provide for the slowest data transmission available via the SPI interface and, in response, generate an error message.

6. The system of claim 1, wherein the processing system is configured to:
provide, in response to lowering the second SPI interface performance level to the third SPI interface performance level, an indication that the third SPI interface performance level provided for the SPI interface do not provide the fastest data transmission capabilities available via the SPI interface.

7. An Information Handling System (IHS), comprising:
a host memory subsystem; and
a processing system that is coupled to the host memory subsystem and that is configured to:
retrieve, via a Serial Peripheral Interface (SPI) interface at a first SPI interface performance level, a first firmware volume that includes a first hash value that was previously generated by performing a hashing operation on a second firmware volume;
store, in the host memory subsystem, the first firmware volume;
increase the first SPI interface performance level to a second SPI interface performance level;
retrieve, via the SPI interface at the second SPI interface performance level, the second firmware volume;
store, in the host memory subsystem, the second firmware volume that was retrieved at the second SPI interface performance level;
perform, on the second firmware volume that was retrieved at the second SPI interface performance level and stored in the host memory subsystem, the hashing operation to generate a second hash value;
lower, in response to the second hash value not matching the first hash value included in the first firmware volume, the second SPI interface performance level to a third SPI interface performance level;
retrieve, via the SPI interface at the third SPI interface performance level, the second firmware volume;
store, in the host memory subsystem, the second firmware volume that was retrieved at the third SPI interface performance level;
perform, on the second firmware volume that was retrieved at the third SPI interface performance level and stored in the host memory subsystem, the hashing operation to generate a third hash value; and
use, in response to the third hash value matching the first hash value included in the first firmware volume, the second firmware volume that was retrieved at the third SPI interface performance level and stored in the host memory subsystem to provide a Basic Input Output System (BIOS).

8. The IHS of claim 7, wherein the first SPI interface performance level include a first SPI interface mode and a first SPI interface speed, and wherein the second SPI interface performance level include:
a second SPI interface mode that provides for data transmission that is faster than the first SPI interface mode; and
a second SPI interface speed that provides for data transmission that is faster than the first SPI interface mode.

9. The IHS of claim 8, wherein the third SPI interface performance level include at least one of:
a third SPI interface mode that provides for data transmission that is faster than the first SPI interface mode and slower than the second SPI interface mode; and
a third SPI interface speed that provides for data transmission that is faster than the first interface mode and slower than the second SPI interface mode.

10. The IHS of claim 7, wherein the processing system is configured to:
lower, in response to the third hash value not matching the first hash value included in the first firmware volume, the third SPI interface performance level to a fourth SPI interface performance level;

retrieve, via the SPI interface at the fourth SPI interface performance level, the second firmware volume;

store, in the host memory subsystem, the second firmware volume that was retrieved at the fourth SPI interface performance level;

perform, on the second firmware volume that was retrieved at the fourth SPI interface performance level and stored in the host memory subsystem, the hashing operation to generate a fourth hash value; and use, in response to the fourth hash value matching the first hash value included in the first firmware volume, the second firmware volume that was retrieved at the fourth SPI interface performance level and stored in the host memory subsystem to provide the BIOS.

11. The IHS of claim 7, wherein the processing system is configured to:

determine, in response to the third hash value not matching the first hash value included in the first firmware volume, that the third SPI interface performance level provide for the slowest data transmission available via the SPI interface and, in response, generate an error message.

12. The IHS of claim 7, wherein the processing system is configured to:

provide, in response to lowering the second SPI interface performance level to the third SPI interface performance level, an indication that the third SPI interface performance level provided for the SPI interface do not provide the fastest data transmission capabilities available via the SPI interface.

13. The IHS of claim 7, wherein the processing system is configured to:

retrieve the second SPI interface performance level from the first firmware volume for use in increasing the first SPI interface performance level to the second SPI interface performance level.

14. A method for adjusting the performance of a boot system, comprising:

retrieving, by a processing system from a Serial Peripheral Interface (SPI) memory subsystem via an SPI interface at a first SPI interface performance level, a first firmware volume that includes a first hash value that was previously generated by performing a hashing operation on a second firmware volume;

increasing, by the processing system, the first SPI interface performance level to a second SPI interface performance level;

retrieving, by the processing system from the SPI memory subsystem via the SPI interface at the second SPI interface performance level, the second firmware volume;

performing, by the processing system on the second firmware volume that was retrieved at the second SPI interface performance level, the hashing operation to generate a second hash value;

lowering, by the processing system in response to the second hash value not matching the first hash value included in the first firmware volume, the second SPI interface performance level to a third SPI interface performance level;

retrieving, by the processing system from the SPI memory subsystem via the SPI interface at the third SPI interface performance level, the second firmware volume;

performing, by the processing system on the second firmware volume that was retrieved at the third SPI interface performance level, the hashing operation to generate a third hash value; and using, by the processing system in response to the third hash value matching the first hash value included in the first firmware volume, the second firmware volume that was retrieved at the third SPI interface performance level to provide a Basic Input Output System (BIOS).

15. The method of claim 14, wherein the first SPI interface performance level include a first SPI interface mode and a first SPI interface speed, and wherein the second SPI interface performance level include:

a second SPI interface mode that provides for data transmission that is faster than the first SPI interface mode; and a second SPI interface speed that provides for data transmission that is faster than the first SPI interface mode.

16. The method of claim 15, wherein the third SPI interface performance level include at least one of:

a third SPI interface mode that provides for data transmission that is faster than the first SPI interface mode and slower than the second SPI interface mode; and a third SPI interface speed that provides for data transmission that is faster than the first interface mode and slower than the second SPI interface mode.

17. The method of claim 14, further comprising:

lowering, by the processing system in response to the third hash value not matching the first hash value included in the first firmware volume, the third SPI interface performance level to a fourth SPI interface performance level;

retrieving, by the processing system from the SPI memory subsystem via the SPI interface at the fourth SPI interface performance level, the second firmware volume;

performing, by the processing system on the second firmware volume that was retrieved at the fourth SPI interface performance level, the hashing operation to generate a fourth hash value; and using, by the processing system in response to the fourth hash value matching the first hash value included in the first firmware volume, the second firmware volume that was retrieved at the fourth SPI interface performance level to provide the BIOS.

18. The method of claim 14, further comprising:

determining, by the processing system in response to the third hash value not matching the first hash value included in the first firmware volume, that the third SPI interface performance level provide for the slowest data transmission available via the SPI interface and, in response, generate an error message.

19. The method of claim 14, further comprising:

providing, by the processing system in response to lowering the second SPI interface performance level to the third SPI interface performance level, an indication that the third SPI interface performance level provided for the SPI interface do not provide the fastest data transmission capabilities available via the SPI interface.

20. The method of claim 14, further comprising:

retrieving, by the processing system, the second SPI interface performance level from the first firmware volume for use in increasing the first SPI interface performance level to the second SPI interface performance level.

* * * * *